United States Patent
Brekke et al.

(10) Patent No.: US 10,230,541 B2
(45) Date of Patent: Mar. 12, 2019

(54) SUBSEA COMMUNICATION ADAPTER

(71) Applicant: Siemens Aktiengesellschaft, Munich (DE)

(72) Inventors: Endre Brekke, Trondheim (NO); Karstein Kristiansen, Trondheim (NO); John Bradford Schofield, Trondheim (NO); Kjetil Zsolt Volent, Trondheim (NO)

(73) Assignee: SIEMENS AKTIENGESELLSCHAFT, Munich (DE)

(*) Notice: Subject to any disclaimer, the term of this patent is extended or adjusted under 35 U.S.C. 154(b) by 295 days.

(21) Appl. No.: 15/182,671

(22) Filed: Jun. 15, 2016

(65) Prior Publication Data
US 2017/0126429 A1  May 4, 2017

(30) Foreign Application Priority Data

Oct. 30, 2015 (EP) .................... 15192287

(51) Int. Cl.
*H04L 12/46* (2006.01)
*H04L 12/40* (2006.01)
(Continued)

(52) U.S. Cl.
CPC .......... *H04L 12/46* (2013.01); *E21B 41/0007* (2013.01); *E21B 47/12* (2013.01);
(Continued)

(58) Field of Classification Search
None
See application file for complete search history.

(56) References Cited

U.S. PATENT DOCUMENTS 6,820,008 B1* 11/2004 van Smirren .......... G01S 15/58
367/90
7,921,916 B2* 4/2011 Lovell .................... H03M 7/30
166/250.01
(Continued)

FOREIGN PATENT DOCUMENTS

CA 2624039 A1 9/2005
EP 2328305 A1 6/2011
(Continued)

OTHER PUBLICATIONS

Extended European Search Report dated Mar. 2, 2018.
European Search Report dated Feb. 9, 2018.

*Primary Examiner* — Backhean Tiv
(74) *Attorney, Agent, or Firm* — Harness, Dickey & Pierce, P.L.C.

(57) ABSTRACT

A subsea communication adapter for providing communication between a first subsea unit including a communication interface operating according to a first communication method and a second subsea unit including a communication interface operating according to a second communication method is provided. The subsea communication adapter includes a first communication interface operating according to the first communication method and a second communication interface operating according to the second communication method. A conversion unit is configured to convert between the first communication method and the second communication method. The conversion includes at least a conversion between a first communication protocol of the first communication method and a second communication protocol of the second communication method.

22 Claims, 4 Drawing Sheets

(51) Int. Cl.
*H04L 29/08* (2006.01)
*H04L 29/06* (2006.01)
*E21B 41/00* (2006.01)
*E21B 47/12* (2012.01)

(52) U.S. Cl.
CPC .............. *H04L 12/40* (2013.01); *H04L 67/12* (2013.01); *H04L 67/141* (2013.01); *H04L 69/08* (2013.01); *H04L 69/18* (2013.01); *H04L 2012/40215* (2013.01); *H04L 2012/40221* (2013.01); *H04L 2012/40228* (2013.01)

(56) References Cited

U.S. PATENT DOCUMENTS

| | | | | |
|---|---|---|---|---|
| 8,208,478 B2* | 6/2012 | Robinson | ............ | H04L 12/4616 340/853.1 |
| 8,432,294 B2* | 4/2013 | Davis | ................ | E21B 33/0355 340/855.3 |
| 9,049,014 B2* | 6/2015 | Kristiansen | ......... | E21B 33/0355 |
| 9,203,640 B2* | 12/2015 | Xi | ............................. | H04L 12/40 |
| 9,444,555 B2* | 9/2016 | Kristiansen | ............ | H04B 13/02 |
| 9,683,438 B2* | 6/2017 | Fanini | ..................... | E21B 47/12 |
| 9,858,810 B2* | 1/2018 | Brekke | .............. | G05B 19/0421 |
| 9,923,601 B2* | 3/2018 | Kristiansen | .............. | H04B 3/46 |
| 2001/0001616 A1* | 5/2001 | Rakib | ................. | H03M 13/256 375/259 |
| 2004/0262008 A1* | 12/2004 | Deans | ................. | E21B 41/0007 166/339 |
| 2008/0217022 A1* | 9/2008 | Deans | ..................... | E21B 47/12 166/338 |
| 2008/0236837 A1* | 10/2008 | Lovell | ..................... | E21B 47/12 166/336 |
| 2010/0040375 A1* | 2/2010 | Sexton | ................... | H04B 10/00 398/104 |
| 2010/0127566 A1* | 5/2010 | Biester | ................ | E21B 33/0355 307/18 |
| 2010/0202463 A1* | 8/2010 | Robinson | ............ | H04L 12/4616 370/400 |
| 2011/0071966 A1* | 3/2011 | Holley | ............... | G05B 23/0243 706/12 |
| 2011/0128064 A1* | 6/2011 | Bagul | .................. | G01R 31/3274 327/365 |
| 2013/0307699 A1* | 11/2013 | Brekke | .............. | G05B 19/0421 340/850 |
| 2014/0093247 A1* | 4/2014 | Jamtveit | ................... | F16L 1/12 398/104 |
| 2014/0124264 A1* | 5/2014 | Al-Yami | ................. | E21B 44/00 175/24 |
| 2015/0094866 A1* | 4/2015 | Pereira | .................. | E21B 33/064 700/282 |
| 2015/0234143 A1* | 8/2015 | Smith | .................. | G02B 6/4494 702/2 |
| 2016/0094298 A1* | 3/2016 | Isfeldt | ................... | G01V 1/226 398/104 |
| 2017/0126429 A1* | 5/2017 | Brekke | ................... | H04L 12/40 |

FOREIGN PATENT DOCUMENTS

| EP | 2713191 A1 | 4/2014 |
|---|---|---|
| EP | 2811350 A1 | 12/2014 |

* cited by examiner

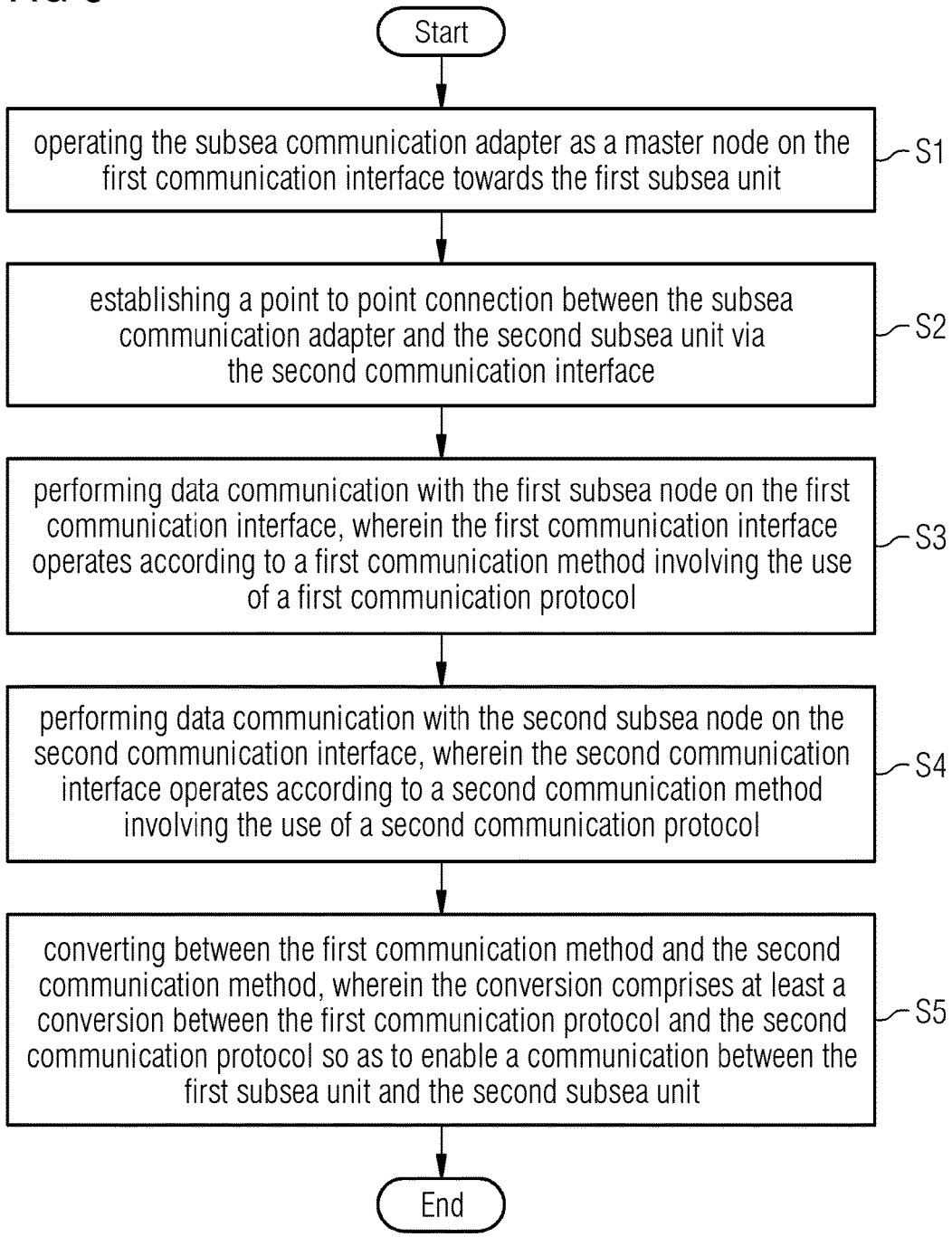

SUBSEA COMMUNICATION ADAPTER

PRIORITY STATEMENT

The present application hereby claims priority under 35 U.S.C. § 119 to European patent application number EP 15192287.9 filed Oct. 30, 2015, the entire contents of which are hereby incorporated herein by reference.

FIELD

At least one embodiment of the present invention generally relates to a subsea communication adapter for providing communication between a first subsea unit and a second subsea unit, to a subsea communication system and/or to a method of communicating data in subsea communication system.

BACKGROUND

Due to the increasing energy demands, offshore oil and gas production is moving into deeper waters. For ensuring an efficient and secure production, processing facilities are being installed on the ocean floor. Such subsea installations can comprise a range of components, including pumps, compressors and the like as well as a power grid for operating them. The power grid may for example comprise a subsea transformer, subsea switch gear and subsea variable speed drives.

Components of such subsea installation can comprise electronic equipment that can be monitored and/or controlled from a topside installation, such as a topside control system which may be located on a fixed or floating vessel, for example a ship or platform, or may be based on shore. The subsea installation can for example comprise one or more subsea control modules, which can receive commands from the topside installation and which can transmit information to the topside installation, such as sensor readings or the like, and which may further communicate with each other. In other configurations, a number of sensors may be interrogated from the topside installation, for example through a subsea communication unit.

An existing subsea communication infrastructure is generally based on a topology in which the equipment installed subsea communicates on a multidrop bus with one unit that is installed topside. In such topology, the topside unit may request certain data, or may send commands to one or more individual subsea units, for example using a round robin scheme. In such communication topologies, all subsea units require the same type of electrical data interface and are required to use the same protocol for data transmission. Further, all units connected to the multidrop bus are required to operate with the same data transmission performance. In a practical implementation, this means that the oldest or slowest unit dictates the bandwidth limitations for all connected units.

The data transmission capability of such multidrop system is accordingly relatively low. Furthermore, since all units are required to adhere to the multidrop data communication, upgrading of such system is difficult and all units would need to be replaced for the introduction of a faster data transmission technology.

Accordingly, it is desirable to improve the communication between subsea units and topside units, and in particular to be capable of increasing the bandwidth and facilitating the upgrading of such communication system.

SUMMARY

The inventors recognize that there is a need for improving the data communication in a subsea system, and in particular to mitigate at least some of the drawbacks mentioned above.

The claims describe embodiments of the invention.

According to an embodiment of the invention, a subsea communication adapter for providing communication between a first subsea unit having a communication interface operating according to a first communication method, in particular a legacy communication method, and a second subsea unit having a communication interface operating according to a second communication method is provided. The subsea communication adapter comprises a first communication interface that is operating according to the first communication method and a second communication interface that is operating according the second communication method. The subsea communication adapter further includes a conversion unit configured to convert between the first communication method and the second communication method. The conversion comprises at least a conversion between a first communication protocol of the first communication method and a second communication protocol of the second communication method. The subsea communication adapter is further configured to be connected in series with a communication link between the communication interface of the first subsea unit and the communication interface of the second subsea unit to enable a communication between the first subsea unit and the second subsea unit.

According to a further embodiment of the invention, a subsea cable comprising a first connector, a second connector and a subsea communication adapter in any of the above outlined configurations is provided. The subsea cable further includes a first cable section connecting the first connector to the first communication interface of the subsea communication adapter and a second cable section connecting the second connector to the second communication interface of the subsea communication adapter. A subsea cable may thus be realized that not only connects the first and second subsea units together, but that also converts between the first communication method and the second communication method, in particular both on a physical level and on a protocol level.

According to a further embodiment of the invention, a method of communicating data in a subsea communication system is provided. The method comprises performing data communication with a first subsea unit on a first communication interface, wherein the first communication interface operates according to a first communication method involving the use of a first communication protocol; performing data communication with a second subsea unit on a second communication interface, wherein the second communication interface operates according to a second communication method involving the use of a second communication protocol; and converting, by means of a conversion unit, between the first communication method and the second communication method. The conversion comprises at least a conversion between the first communication protocol and the second communication protocol so as to enable a communication between the first subsea unit and the second subsea unit. The method may be performed by a subsea communication adapter according to any of the above outlined configurations.

It is to be understood that the features mentioned above and those yet to be explained below can be used not only in the respective combinations indicated, but also in other combinations or in isolation without leaving the scope of the present invention. In particular, the method may be performed with the subsea communication adapter, the subsea cable or the subsea communication system in any of the above outlined configurations, and the subsea communication adapter, the subsea cable or the subsea communication system may be configured so as to perform embodiments of the method described herein.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

FIG. 5 is a flow diagram illustrating a method according to an embodiment.

DETAILED DESCRIPTION OF THE EXAMPLE EMBODIMENTS

Figure 1:
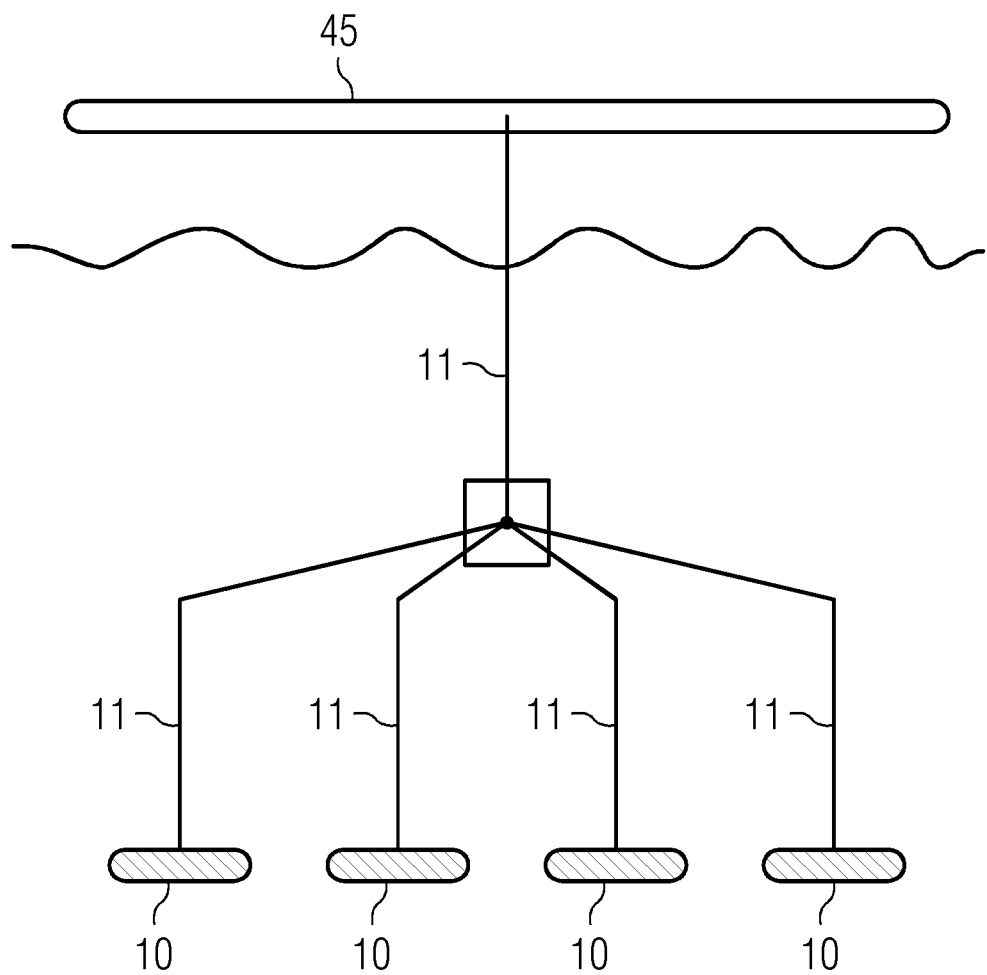
FIG. 1 is a schematic drawing showing a subsea data communication system according to the prior art.

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to an embodiment of the invention, a subsea communication adapter for providing communication between a first subsea unit having a communication interface operating according to a first communication method, in particular a legacy communication method, and a second subsea unit having a communication interface operating according to a second communication method is provided. The subsea communication adapter comprises a first communication interface that is operating according to the first communication method and a second communication interface that is operating according the second communication method. The subsea communication adapter further includes a conversion unit configured to convert between the first communication method and the second communication method. The conversion comprises at least a conversion between a first communication protocol of the first communication method and a second communication protocol of the second communication method. The subsea communication adapter is further configured to be connected in series with a communication link between the communication interface of the first subsea unit and the communication interface of the second subsea unit to enable a communication between the first subsea unit and the second subsea unit.

Such subsea communication adapter may facilitate the upgrading of components of a subsea installation, without the need to replace the whole communication system. In particular, only some communication nodes of such subsea installation may be exchanged and may be provided with a new and improved communication method, while other parts of the subsea installation operating according to the legacy communication method can be kept operational. Communication bandwidth may thus be improved for newly installed subsea units, while communication with the already existing subsea units (legacy subsea units) may be maintained. The use of one or more subsea communication adapters in a subsea installation may allow a progressive replacement and upgrading of individual subsea units while operation of the remaining existing subsea units can continue. The upgrading of existing subsea units may thus be made independent of the upgrading of the subsea communication infrastructure itself. The subsea communication adapter may be considered to form part of the communication link between the first subsea unit and the second subsea unit.

The first communication method may be a legacy communication method and the second communication method may be an Ethernet communication method.

In an embodiment, the first communication method is a non-Ethernet communication method, and the first communication protocol is a non-Ethernet communication protocol. The first communication interface may be a non-Ethernet communication interface. The first communication interface may in particular be an electrical communication interface. The first communication interface may make use of a physical layer that is different from the Ethernet physical layer. This may comprise the use of different voltage levels and/or different frequencies for data transmission compared to the Ethernet physical layer.

The first communication method may use a multidrop capable communication scheme, or a multidrop communication scheme, and/or a multi master communication scheme. Such legacy communication methods are typically employed for data communication in existing subsea installations. Accordingly, the subsea communication adapter may be used to upgrade a subsea installation making use of such communication methods without the need to replace all subsea units employing the communication method at the same time.

As an example, the first communication interface may be configured to establish at least one of a CAN (controller area network) connection, RS-485 connection (also termed TIA/EIA-485), RS-422 connection (also termed TIA/EIA-422), an RS-232 connection (also termed TIA-232), or a network modem connection, in particular a FSK (frequency-shift keying), PSK (phase-shift keying), QPSK (quadrature phase-shift keying), or ASK (amplitude-shift keying) modem connection. As an example, the first communication interface may be configured to establish a modem connection according to the Bell 202 standard. The subsea communication adapter may thus be employed to allow the communication with a subsea unit employing one of these legacy communication methods. The first communication interface may be physically configured for communication using the physical layer of the respective communication method.

The first communication method may operate according to a CAN communication protocol, in particular an CAN-open communication protocol, a Profibus communication protocol, a Modbus communication protocol, or another (for example proprietary) non-Ethernet communication protocol. The subsea communication adapter may thus be capable of providing communication with an existing subsea unit employing such communication protocol.

In an embodiment, the second communication method operates according to an Ethernet based communication protocol, in particular the Ethernet communication protocol. The second communication interface may be configured to establish an Ethernet connection. This may either be an electrical or an optical Ethernet connection. In particular, it may be an Ethernet physical layer based connection, i.e. it may employ the Ethernet physical layer (which can be electrical or optical). The Ethernet physical layer may be chosen in accordance with the respective requirements of the communication link, such as bandwidth and distance, so that a high bandwidth communication can be achieved with newly installed subsea units, while allowing continued communication using the legacy communication methods with the existing subsea units.

In an embodiment, the subsea communication adapter may be configured to convert between the first communication method and the second communication method both on a physical level and on a protocol level. The conversion on a physical level may for example comprise the conversion between a signal voltage level at the first communication interface and a different signal voltage level at the second communication interface.

The first communication method may for example use voltages and/or frequencies for communication that are different to voltages/frequencies used for communication by the second communication method, which may also be an optical communication method as outlined above. The subsea communication adapter may thus for example convert between the first communication method employing a physical layer such as a differential serial bus, in particular a CAN bus, an RS-485, RS-422 or RS-232 physical layer or a network modem physical layer and the physical layer of second communication method, which may employ the Ethernet physical layer. It may also convert between the respective communication protocols, such as the CAN protocol (or CAN transfer layer), Profibus, Modbus or another (e.g. proprietary) communication protocol employed by the first communication method and the Ethernet communication protocol employed by the second communication method (comprising for example the Ethernet data link layer).

In an embodiment, the conversion unit is configured to convert a communication signal according to the first communication method received at the first communication interface to an Ethernet communication signal for transmission on the second communication interface, and to convert an Ethernet communication signal received at the second communication interface to a communication signal according to the first communication method for transmission on the first communication interface. Such conversion may include the extraction of data from the communication signal in accordance with the first communication protocol and of packaging the data and generating a communication signal in accordance with the second communication protocol, and vice versa.

The first communication interface may be an electrical interface, and the second communication interface may be an electrical or an optical communication interface.

In an embodiment, the subsea communication adapter is configured to establish a point to point connection via the second communication interface. Using point to point connections in the new subsea communication infrastructure may allow establishing individual communication links adapted to the respective purpose while enabling transparent Ethernet communication over these communication links.

The subsea communication adapter may be configured to act as a master node of a multidrop or a multi-master communication system on the first communication interface. After partial replacement of subsea units, an existing subsea unit may thus continue communication as it did previously in a multidrop or multi-master communication system.

In an embodiment, the subsea communication adapter comprises a subsea enclosure, wherein the subsea enclosure is configured to allow the deployment of the subsea communication adapter in a water depth of 350 m or more, preferably of 1,000 m or more. The subsea enclosure may be a pressure resistant enclosure that maintains a predefined internal pressure when installed subsea, such as a pressure below 10 bar, for example a pressure between about 1.5 bar and about atmospheric pressure. The subsea enclosure may comprise a chamber in which the conversion unit is disposed. In other embodiments, the subsea enclosure may be a pressure compensated enclosure that comprises a pressure compensation element that balances the pressure inside such chamber to the pressure prevailing in the surrounding subsea environment. Examples of such pressure compensation element comprise a bellows, a bladder, a membrane or the like.

In an embodiment, the subsea communication adapter comprises at least one cable section comprising a data line coupled to the first communication interface for establishing a communication link according to the first communication method. Additionally or alternatively, it may comprise a second cable section comprising a second date line that is coupled to the second communication interface for establishing a communication link according to the second communication method. The second data line may for example be an electrical or an optical data line. The subsea communication adapter may for example be realized as a subsea cable that can be used for connecting an existing subsea unit to an upgraded subsea unit that comprises new communication infrastructure operating according to the second communication method.

In some embodiments, the subsea communication adapter may also be comprised within a housing of the first or second subsea unit, or may be attached to or form part of a subsea connector.

According to a further embodiment of the invention, a subsea cable comprising a first connector, a second connector and a subsea communication adapter in any of the above outlined configurations is provided. The subsea cable further includes a first cable section connecting the first connector to the first communication interface of the subsea communication adapter and a second cable section connecting the second connector to the second communication interface of the subsea communication adapter. A subsea cable may thus be realized that not only connects the first and second subsea units together, but that also converts between the first communication method and the second communication method, in particular both on a physical level and on a protocol level.

When parts of a subsea installation upgraded, existing subsea units may thus be retained, and communication with these existing subsea units may be achieved by such subsea cable including a communication adapter that is configured in accordance with the communication method used by the existing subsea unit. The newly installed subsea units can thus all make use of a standard upgraded communication scheme, such as Ethernet, while it remains possible to communicate with the existing subsea units. Furthermore, in such communication system, the oldest or slowest subsea unit does no longer dictate the bandwidth limitations for the remaining units. While in conventional subsea installations, the replacement or upgrading of a subsea unit always required such upgraded subsea unit to employ the same legacy communication method, the subsea cable allows the use of a new and faster communication method without other need to replace legacy subsea units and the whole subsea communication infrastructure.

According to a further embodiment of the invention, a subsea communication system for providing communication with the first subsea unit having a communication interface operating according to a first communication method, in particular a legacy communication method, is provided. The subsea communication system comprises a second subsea unit having a communication interface operating according to a second communication method, and a communication link from the second subsea unit towards the first subsea unit. A subsea communication adapter in any of the above outlined configurations is connected in series with the communication link between the communication interface of the first subsea unit and the communication interface of the second subsea unit. It may thus be considered to form part of the communication link. In such subsea communication system, advantages similar to the ones outlined further above may be achieved.

In an embodiment, the second subsea unit comprises several communication interfaces operating according to the second communication method, and the subsea communication system may comprise several communication links each including a subsea communication adapter by means of which several first subsea units are connected to the second subsea unit. Several first subsea units working according to the same or different legacy communication methods may thus be connected to the same second subsea unit that operates according to the second communication method. This can be achieved by employing the respective subsea communication adapters which are configured in correspondence to the respective communication method employed by the first subsea unit to which they are connected.

The second subsea unit may be a subsea communication distribution unit that comprises plural communication interfaces operating according to the second communication method. In particular these plural communication interfaces may operate according to the Ethernet standard and may use electrical and/or optical medium for Ethernet transmission.

In an embodiment, to at least one of the communication interfaces of the subsea communication distribution unit, a further subsea unit may be connected via a further communication link. The further subsea unit may include a communication interface operating according to the second communication method. The further communication link may be an Ethernet link, and the second subsea unit and the further subsea unit may be configured to establish a point to point connection over the further communication link. The second subsea unit may thus distribute communication towards first subsea units operating according to the first communication method and towards further subsea units operating according to the second communication method.

The subsea communication system may further comprise a topside communication link from at least one of the communication interfaces of the subsea communication distribution unit to a topside unit located above the water surface. A point to point connection may be established via this topside communication link. The topside communication link may use optical fiber as a transmission medium. An increased bandwidth for data transmission may thus be achieved.

It should be clear that the communication link may comprise a range of physical elements. As an example, the topside communication link may comprise a subsea jumper cable with respective connectors, in umbilical termination unit, in an umbilical and the like.

According to a further embodiment of the invention, a method of communicating data in a subsea communication system is provided. The method comprises performing data communication with a first subsea unit on a first communication interface, wherein the first communication interface operates according to a first communication method involving the use of a first communication protocol; performing data communication with a second subsea unit on a second communication interface, wherein the second communication interface operates according to a second communication method involving the use of a second communication protocol; and converting, by means of a conversion unit, between the first communication method and the second communication method. The conversion comprises at least a conversion between the first communication protocol and the second communication protocol so as to enable a communication between the first subsea unit and the second subsea unit. The method may be performed by a subsea communication adapter according to any of the above outlined configurations.

With such method, advantages similar to the ones outlined further above with respect to the subsea communication adapter may be achieved.

In an embodiment, the method may further comprise establishing a point to point connection with the second subsea unit, and operating as a master note of a multidrop capable or multi-master communication bus on the first communication interface. Accordingly, the subsea adapter unit may appear on the second communication interface as regular Ethernet node, and may appear on the first communication interface as a master node connected to the respective data communication bus.

FIG. 1 illustrates a conventional subsea communication system in which a topside unit 45 that communicates with several subsea units 10. Communication occurs via a multidrop communication scheme on the multidrop communication links 11. In such configuration, all subsea units 10 are restricted to the same communication performance, and the oldest and slowest unit generally dictates the bandwidth limitations for all other units. In such multidrop communication system, the same communication signal levels and the same communication protocol need to be used by all units. Accordingly, upgrading of such system, in particular to the use of another type of communication, is generally difficult.

Figure 2:
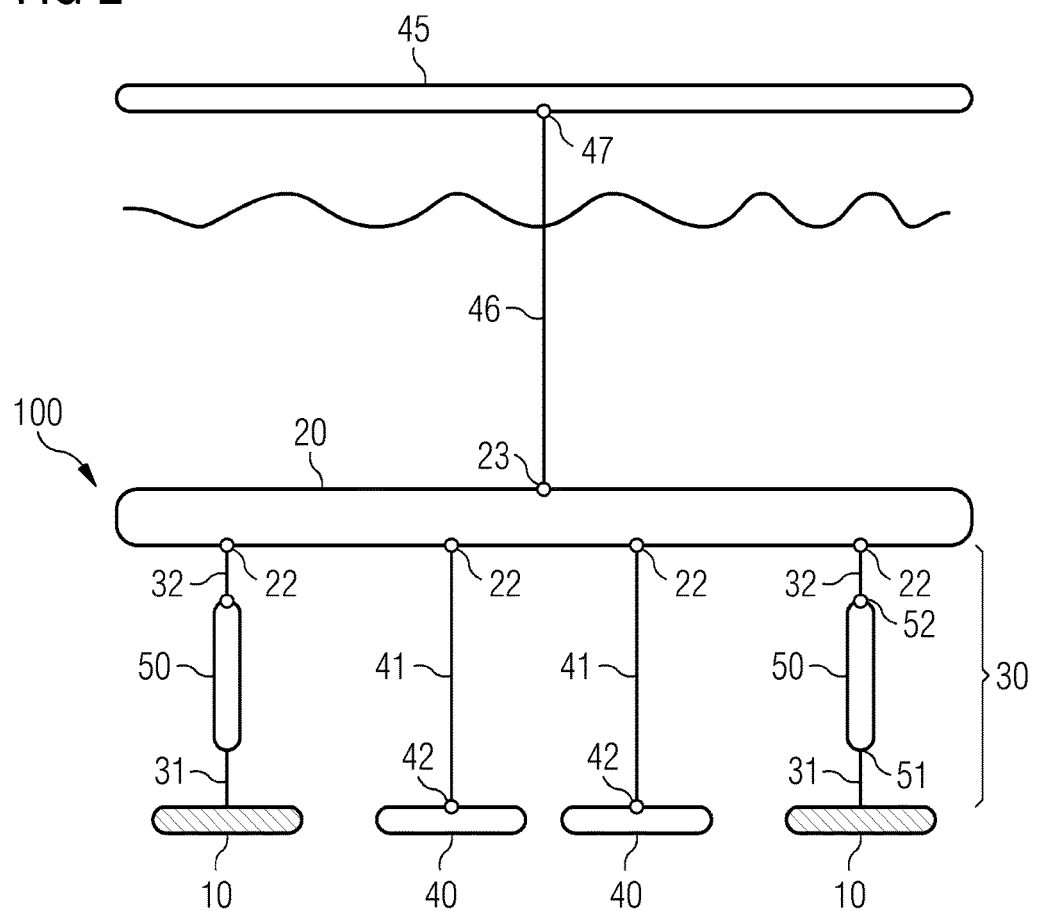
FIG. 2 is a schematic drawing showing a subsea communication system according to an embodiment.

FIG. 2 shows a subsea communication system 100 according to an embodiment of the invention. Such system provides an upgrade of the communication infrastructure, while it allows communication with the existing subsea units 10, termed legacy subsea units hereinafter. Legacy subsea units 10 employ a first communication method for data communication, which is a legacy method that allows data communication only at a reduced bandwidth compared to state of the art communication methods. The subsea communication system 100 comprises a subsea communication distribution unit (SCDU) 20 that communicates by making use of a second communication method that achieves a higher data communication bandwidth compared to the first communication method. It may furthermore comprise one or more new subsea units 40 that also employ the second communication method for communicating with the subsea communication distribution unit 20.

The second communication method is preferably an Ethernet communication method. The subsea communication distribution unit 20 comprises several communication interfaces 22, 23 operating according to the second communication method. Similarly, the new subsea units 40 comprise a communication interface 42 operating according to the second communication method. A communication link 41 is established between the respective new subsea unit 40 and the subsea communication distribution unit (SCDU) 20, for example by making use of a subsea Ethernet jumper cable or the like. Communication link 41 can be an electrical or an optical communication link.

Similarly, the topside unit 45 comprises a communication interface 47 operating according to the second communication method. A topside communication link 46 is established between the communication interfaces 23, 47 of the SCDU 20 and the topside unit 45. Although the communication links 41 and 46 are both Ethernet communication links, they may be different on a physical level. As an example, the communication link 46 may employ an optical fiber as a transmission medium and may make use of optical fiber high speed transceivers (e.g. according to 100BASE-FX), whereas the communication link 41 may employ electrical conductors as a transmission medium and Ethernet network interface cards for establishing the connection (e.g. according to 100BASE-T).

In particular, a point to point connection can be established between the topside unit 45 and the SCDU 20. Furthermore, a point to point connection can be established between the SCDU 20 and each of the connected new subsea units 40. SCDU 20 may operate as a network switch.

By making use of the SCDU 20 and the Ethernet communication links 41, 46, a high bandwidth data communication can be achieved with the new subsea units 40. New in this sense means that the unit was installed in a subsea installation that already comprises previously installed subsea units, such as the "old" subsea units 10. In other applications, subsea units operating according to the first communication method and subsea units operating according to the second communication method may be installed together in a new or existing subsea installation.

The first communication method employed by the legacy subsea units 10 is incompatible with the second communication method employed by the SCDU 20, so that these units cannot be directly linked. The subsea communication system 100 comprises a subsea communication adapter 50 that is connected in series with a communication link 30 between the legacy subsea unit 10 and the SCDU 20. In other words, the subsea communication adapter 50 forms part of the communication link 30. Subsea communication adapter 50 comprises a first communication interface 51 operating according to the first communication method and a second communication interface 52 operating according to the second communication method. A first part 31 of the communication link 30 provides a connection between the first interface 51 and a respective interface of a first subsea unit in form of the legacy subsea unit 10, and a second part 32 of the link provides a connection between the second interface 52 and the interface 22 of the second subsea unit in form of the SCDU 20. Accordingly, the subsea communication adapter 50 can communicate with the SCDU 20 via the communication link part 32, and communicate with the legacy subsea unit 10 via the first communication link part 31.

The subsea communication adapter 50 comprises a conversion unit that provides conversion between the first communication method and the second communication method. The conversion involves at least the conversion between a first communication protocol of the first communication method and a second communication protocol of the second communication method. Preferably, it involves a conversion between the two communication methods both on a physical level and on a protocol level.

By way of the subsea communication adapter 50, a communication with the legacy subsea unit 10 is thus achieved, even if the subsea unit 10 employs different physical communication means, such as different voltages and/or frequencies, a different communication medium, and/or a different communication protocol. The topside unit 45 may thus communicate with the legacy subsea unit 10 via the SCDU 20 without the need to implement any proprietary or legacy communication methods in the SCDU 20. Topside unit 45 may for example obtain a sensor reading from legacy subsea unit 10, or send a control command to the legacy subsea unit 10. At the same time, it can communicate with high bandwidth with the new subsea units 40. Accordingly, the first communication method employed by the legacy subsea unit 10 does not restrict the communication bandwidth of the subsea communication system 100.

Figure 4:
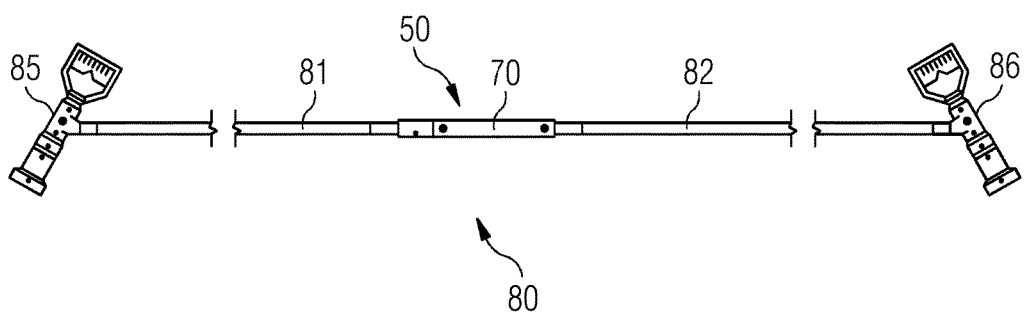
FIG. 4 is a schematic drawing showing a subsea cable according to an embodiment.

A Subsea communication adapter 50 can be provided as a unit disposed between two sections of subsea cable. This is for example illustrated in FIG. 4 showing an embodiment. The first part 31 of the communication link 30 is provided by a first cable section 81 and a subsea connector 85, preferably a wet-mateable connector. Similarly, the second part 32 of the communication link 30 is provided by a second cable section 82 and a second subsea connector 86, preferably a wet-mateable connector. Between the cable sections 81, 82, the subsea communication adapter 50 is disposed. The subsea communication adapter 50 comprises the subsea enclosure 70 which may be equipped with respective fittings for the attachment of the cable sections 81, 82. The subsea cable 80 provides the communication link 30. It should be clear that the connectors 85, 86 are adapted to the respective physical requirements of the respective communication method. As an example, if the second communication link part 32 is an optical communication link, the connector 86 may be an optical connector (or may at least perform a conversion of the optical signal to an electrical signal). For an electrical link, the electrical contacts of the respective subsea connector can be adapted in accordance with the number of signal and/or power lines employed in the respective communication link.

Preferably, the subsea communication adapter 50 is provided as part of the subsea cable 80, as illustrated in FIG. 4. In other embodiments, the subsea communication adapter 50 may be mounted to or provided integrally with one of the connectors 85, 86, or it may be provided inside the SCDU 20. Although the latter option may avoid the additional subsea housing 70, it would require a proprietary interface on the SCDU 20 that provides connectivity to the legacy subsea unit 10. With the embodiment as outlined in FIG. 4, the SCDU 20 can have standardized communication interfaces 22 operating according to the second communication method, preferably Ethernet interfaces.

Figure 3:
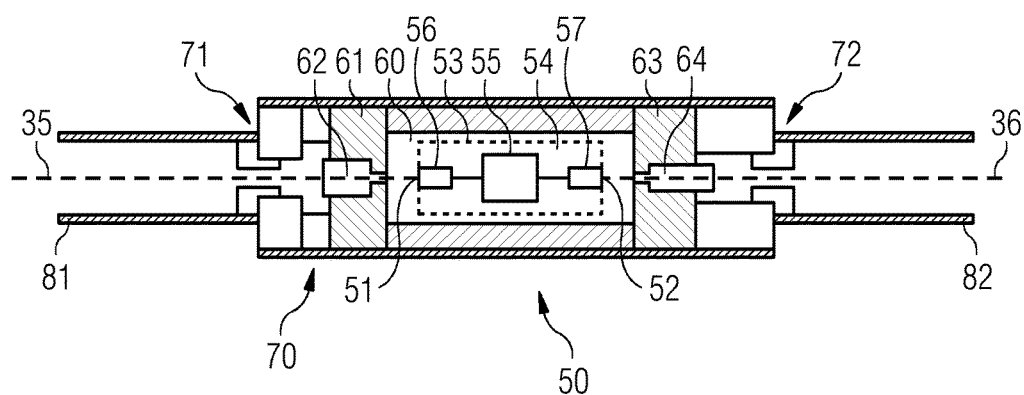
FIG. 3 is a schematic drawing showing a subsea communication adapter according to an embodiment.

FIG. 3 illustrates a particular implementation of the subsea communication adapter 50 that can be used with the subsea communication system 100 of FIG. 2, so the explanations given above are equally applicable. In the embodiment of FIG. 3, the subsea communication adapter 50 is provided with a subsea housing 70 in which a chamber 60 is provided. In the embodiment of FIG. 3, the subsea enclosure 70 is a pressure resistant enclosure so that a predefined pressure is maintained inside the chamber 60. This may be a close to atmospheric pressure, or a pressure slightly above the atmospheric pressure, such as 10 bar or less, in particular 1.5 bar or less. In other configurations, the chamber 60 may be filled with a dielectric liquid or gel and may be pressure compensated against the subsea environment. For this purpose, a pressure compensator such as a flexible membrane, a bellows or bladder may be included in the subsea communication adapter 50 for providing pressure balancing.

The subsea enclosure 70 is provided with a first fitting 71 for mounting the cable section 81, and a second fitting 72 for mounting the cable section 82. Cable sections 81, 82 may be provided by conventional subsea cables or by oil-filled hoses in which one or more conductors and/or optical fibers are disposed. By means of the first data line 35, the first part 31 of the communication link 30 is provided. Data line 35 may accordingly comprise one or more electrical conductors, for example two conductors of a differential serial bus. Similarly, the data line 36 provides the second part 32 of the communication link 30. Again, data line 36 may for example include two, four or more electrical conductors for data communication, or may include one ore optical fibers.

Furthermore, electrical conductors for power transmission may be provided additionally in one or both of the cable sections 81, 82, or electrical power may be provided to the subsea communication adapter 50 through one of the data lines 35, 36. The subsea communication adapter 50 may for example be powered by making use of 'power over Ethernet', so that the electrical conductors providing the data line 36 may transport the electrical power. In a preferred configuration, at least two additional electrical conductors are provided in the second cable section 82 for transporting electrical power. The connection provided by the second cable section 82 may for example be an SIIS (Subsea Instrumentation Interface Standardization) Level-3 compliant connection comprising two Ethernet connections with four electrical conductors each, and two additional electrical conductors for power transmission. Accordingly, the subsea connector 86 may be a 10 pin or 12 pin electrical connector.

For leading the data lines 35, 36 into the atmospheric chamber 60, penetrators 62, 64 are provided in the respective end walls 61, 63 of the subsea enclosure 70. The penetrators 62, 64 are capable of sealing against the data lines and of withstanding the high pressure differences when deployed subsea. They may for example employ epoxy resin or glass as sealing material, or may make use of elastomeric O-ring seals around conductors, depending on the type of data line.

The subsea communication adapter 50 comprises a conversion unit 53 that converts between the first communication method and the second communication method. The conversion unit 53 is disposed in the chamber 60 of housing 70. The conversion unit 53 comprises electric and electronic circuits on one or more circuit boards 54. The conversion unit comprises respective transceivers (for example 56, 57) operating according to the respective first and second communication methods for providing the first and second communication interfaces 51, 52. It further comprises a micro-controller or micro-processor 55, and associated elements such as memory and the like for providing a conversion between the first and second communication protocols of the first and second communication methods. It should be appreciated that the partitioning of embodiments in functional blocks or units shown in the drawings is not to be construed as indicating that these units necessarily are implemented as physically separate units, but functional blocks or units shown or described may be implemented as separate units, circuits, chips or circuit elements, but one or more functional blocks or units may as well be implemented in a common circuit, chip, circuit element or unit.

The first communication interface 51 may be provided by a multidrop transceiver 56, it may for example be provided by a CAN transceiver. The first communication interface 51 may be implemented in form of a CAN Bus interface, a Serial Bus interface, such as RS-232, RS-422 or RS-485, or the first communication interface 52 may be provided by a network modem using a legacy communication scheme. Example of such network modems include an FSK (Frequency-Shift Keying), PSK (Phase-Shift Keying), QPSK (Quadrature-Phase Shift Keying) or ASK (Amplitude-Shift Keying) Modem. As a particular example, the first communication interface 51 may provide a connection according to the Bell 202 standard, which is commonly used in legacy subsea units.

The second communication interface 52 may be provided by a network interface controller 57, which may include a media access controller. Such network interface controller 57 may for example comprise a 10/100/1000-Base-T-transceiver, or it may comprise an optical transceiver operating for example according to 10-Base-F, 100-Base-FX, or 1000-Base-SX, only to name a few examples.

The type of physical interface provided by the first communication interface 51 is generally chosen in accordance with the type of physical interface used by the legacy subsea unit 10 towards which communication needs to be established. As an example, a subsea cable 80 employing the subsea communication adapter 50 can be tailor-made to the respective legacy subsea unit 10 for enabling communication therewith.

The conversion unit 53 may for example convert between data communication received on the first communication interface 51 according to a first communication protocol, and provide conversion into a data communication according to the Ethernet communication protocol, and furthermore transmits the data communication via the second communication interface 52. Similarly, a data communication received at the second communication interface 52 is converted by means of the conversion unit 53 into a data communication according to the first communication protocol for transmission on the first communication interface 51.

On the first communication interface 51, communication generally occurs in accordance with the communication protocol used by the legacy subsea unit 10 towards which a connection is to be established. This may for example be a multidrop communication protocol. In particular, it may be a CAN communication protocol, such as CAN-open, or it may be a Profibus, Modbus or other non-Ethernet communication protocol. On the second communication interface 52, data communication may occur according to an Ethernet communication protocol.

The conversion unit 53 may for example extract data from an Ethernet communication received on the second interface 52, and may package the data in accordance with the CAN-open, Profibus or Modbus communication protocol for transmission via the first interface 51, and vice versa.

The subsea communication adapter 50 may thus act as an Ethernet network node on the second communication interface 52. Other nodes in such Ethernet network provided by the SCDU 20 will thus have the impression of directly communication with the old subsea unit 10.

The subsea communication adapter 50 can furthermore be configured to act as a master node of the respective communication protocol on the first communication interface 51, when employing a respective communication scheme requiring such master node to be present. As an example, when the legacy subsea unit 10 is configured as a slave node of a multidrop communication network, for example using RS-485 or RS-422 communication links, the subsea communication adapter 50 acts as a master node in accordance with the respective communication scheme. When acting as a master node, the subsea communication adapter 50 may for example initiate the communication with the legacy subsea unit 10. Conversion unit 53 may implement respective functions to act as a master node or of such multidrop or multi-master communication scheme.

The legacy subsea unit 10 may thus get the impression that it is still connected to a legacy communication network when communicating over the first part 31 of communication link 30 with the subsea communication adapter 50.

In a particular embodiment, the subsea communication adapter 50 is configured to convert between a SIIS Level-1 or Level-2 compliant communication link on the first communication interface and an SIIS Level-3 compliant communication link on the second communication interface.

The above described embodiments may thus allow deployment of new communication infrastructure with standardized communication interfaces, in particular Ethernet communication interfaces, while at the same time, legacy subsea units employing legacy communication methods can still form part of the subsea installation and can still be communicated with. This does not require the adaptation of interfaces of the SCDU 20, but specific subsea cables 80 employing embodiments of the subsea communication adapter 50 can be used for achieving such communication.

Any proprietary legacy communication interfaces or protocols can be comprised in the communication adapter 50, e.g. in subsea cable 80, thus not requiring modification of the standard interfaces of the upgraded subsea equipment. The legacy subsea unit 10 will thus not be aware of the new Ethernet communication network.

FIG. 5 illustrates a method according to an embodiment of the invention. In first step S1, the subsea communication adapter is operated as a master node on the first communication interface towards the first (legacy) subsea unit 10. In step S2, a point to point connection is established between the subsea communication adapter 50 and the second subsea unit in form of the SCDU 20 via the second communication interface.

In step S3, data communication is performed by the subsea communication adapter with the first subsea node on the first communication interface. The first communication interface operates according to the first communication method that involves the use of the first communication protocol. In step S4, the data communication is performed by the subsea communication adapter with the second subsea node, i.e. the SCDU 20, on the second communication interface 52. The second communication interface operates according to the second communication method involving the use of the second communication protocol.

In step S5, the communication adapter converts between the first communication method and the second communication method. This involves at least the conversion between the first communication protocol and the second communication protocol. By means of the different physical interfaces 51, 52, conversion is also provided on the physical level. Accordingly, a communication between the first subsea unit and the second subsea unit is enabled.

It should be clear that the steps of the method may be performed simultaneously and/or in a different order. As an example, steps S1 and S2 may be performed in reverse order or simultaneously, and step S5 may be performed after step S3 after receiving a data communication on the first communication interface, or after step S4 when receiving a data communication on the second communication interface.

By providing a legacy communication interface to the legacy subsea unit, and by providing for example an Ethernet communication interface to the upgraded communication infrastructure, the communication with legacy subsea units is achieved when new subsea infrastructure is deployed. The communication can be achieved even though the legacy subsea unit employs different communication methods on a physical and a protocol level. Restrictions encountered in conventional subsea communication systems, such as that each subsea unit needs to employ the same physical interfaces and communication protocols, and that the slowest subsea unit dictates the communication bandwidth can be avoided. By means of the subsea communication adapter, subsea installations can be upgraded without the need to replace or to modify existing subsea units that are supposed to remain operational.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A subsea cable comprising:
   a subsea communication distribution hub having a plurality of communication interfaces operating according to a first communication method;
   a plurality connectors connected to and downstream of the subsea communication distribution hub;
   at least one first subsea unit downstream of the plurality of connectors;
   at least one second subsea unit downstream of the plurality of connectors and operating according to the first communication method;
   a subsea communication adapter downstream of one of the plurality of connectors, the subsea communication adapter configured to provide communication between a first subsea unit and the subsea communication distribution hub, the subsea communication adapter including a first communication interface operating according to the first communication method, and a second communication interface operating according to a second communication method and connected to the first subsea unit, the subsea communication adapter including
   a conversion unit, configured to convert between the first communication method and the second communication method, the conversion including at least a conversion between a first communication protocol of the first communication method and a second communication protocol of the second communication method, wherein the subsea communication adapter is configured to be connected in series with a communication link between the communication interface of the first subsea unit and the communication interface of the subsea communication distribution hub to enable a communication between the first subsea unit and the subsea communication distribution hub;
   a first cable section connecting the first connector to the first communication interface of the subsea communication adapter, and
   a second cable section connecting the second connector to the second communication interface of the subsea communication adapter, wherein the subsea communication adapter is disposed as part of the subsea cable between the first cable section and the second cable section.

2. The subsea cable of claim 1, wherein at least one of the first communication method is a non-Ethernet communication method and the first communication protocol is a non-Ethernet communication protocol, and the first communication interface is a non-Ethernet communication interface.

3. The subsea cable of claim 2, wherein the subsea communication adapter is configured to convert between the first communication method and the second communication method both on a physical level and on a protocol level.

4. The subsea cable of claim 2, wherein the first communication method uses at least one of a multidrop capable communication scheme and a multi master communication scheme.

5. The subsea cable of claim 2, wherein the conversion unit is configured to convert a communication signal according to the first communication method received at the first communication interface to an Ethernet communication signal for transmission on the second communication interface, and to convert a Ethernet communication signal received at the second communication interface to a communication signal according to the first communication method for transmission on the first communication interface.

6. The subsea cable of claim 1, wherein the subsea communication adapter is configured to convert between the first communication method and the second communication method both on a physical level and on a protocol level.

7. The subsea cable of claim 1, wherein the first communication method uses at least one of a multidrop capable communication scheme and a multi master communication scheme.

8. The subsea cable of claim 1, wherein the first communication interface is configured to establish at least one of a CAN connection, an RS-485 connection, an RS-422 connection, a RS-232 connection, or a network modem connection.

9. The subsea cable of claim 8, wherein the connections include at least one of a FSK, PSK, QPSK, and ASK modem connection.

10. The subsea cable of claim 1, wherein the first communication method operates according to a CAN communication protocol, a CAN-open communication protocol, a Profibus communication protocol, a Modbus communication protocol, or another non-Ethernet communication protocol.

11. The subsea cable of claim 1, wherein at least one of the second communication method operates according to an Ethernet based communication protocol, and the second communication interface is configured to establish an Ethernet connection.

12. The subsea cable of claim 1, wherein the conversion unit is configured to convert a communication signal according to the first communication method received at the first communication interface to an Ethernet communication signal for transmission on the second communication interface, and to convert a Ethernet communication signal received at the second communication interface to a communication signal according to the first communication method for transmission on the first communication interface.

13. The subsea cable of claim 1, wherein the subsea communication adapter is configured to establish a point to point connection via the second communication interface.

14. The subsea cable of claim 1, wherein the subsea communication adapter is configured to act as a master node of a multidrop or a multi master communication system on the first communication interface.

15. The subsea cable of claim 1, wherein the subsea communication adapter comprises a subsea enclosure, wherein the subsea enclosure is configured to allow deployment of the subsea communication adapter in a water depth of 350 m or more.

16. The subsea cable of claim 15, wherein the subsea enclosure is a pressure resistant enclosure that maintains a predefined internal pressure when installed subsea.

17. The subsea cable of claim 15, wherein the subsea enclosure is a pressure resistant enclosure that maintains a predefined internal pressure when installed subsea, and wherein the subsea enclosure is configured to allow deployment of the subsea communication adapter in a water depth of 1,000 m or more.

18. The subsea cable of claim 15, wherein the subsea enclosure is a pressure resistant enclosure that maintains a predefined internal pressure when installed subsea.

19. The subsea cable of claim 1, wherein the first communication method is a legacy communication method.

20. A subsea communication system for providing communication with a first subsea unit including a communication interface operating according to a first communication method, comprising:
- a second subsea unit including a communication interface operating according to a second communication method; and
- the subsea cable of claim 1 connected between the communication interface of the first subsea unit and the communication interface of the second subsea unit.

21. The subsea communication system of claim 20, wherein the second subsea unit is a subsea communication distribution unit that includes plural communication interfaces operating according to the second communication method.

22. The subsea communication system of claim 20, wherein the first communication method is a legacy communication method.

* * * * *